(12) United States Patent
Vaderna et al.

(10) Patent No.: US 12,531,773 B2
(45) Date of Patent: Jan. 20, 2026

(54) ROOT CAUSE ANALYSIS

(71) Applicant: Telefonaktiebolaget LM Ericsson (publ), Stockholm (SE)

(72) Inventors: Péter Vaderna, Budapest (HU); Péter Kersch, Budapest (HU); Zsófia Kallus, Budapest (HU); Tamas Borsos, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 357 days.

(21) Appl. No.: 18/028,910

(22) PCT Filed: Oct. 8, 2020

(86) PCT No.: PCT/SE2020/050961
§ 371 (c)(1),
(2) Date: Mar. 28, 2023

(87) PCT Pub. No.: WO2022/075897
PCT Pub. Date: Apr. 14, 2022

(65) Prior Publication Data
US 2023/0353447 A1 Nov. 2, 2023

(51) Int. Cl.
*H04L 41/0631* (2022.01)
*H04L 41/16* (2022.01)

(52) U.S. Cl.
CPC ......... *H04L 41/0631* (2013.01); *H04L 41/16* (2013.01)

(58) Field of Classification Search
None
See application file for complete search history.

(56) References Cited

U.S. PATENT DOCUMENTS 7,062,683 B2 * 6/2006 Warpenburg ....... H04L 41/0631
714/E11.026
8,156,378 B1 * 4/2012 Suit ................... G06F 11/0709
714/26
(Continued)

FOREIGN PATENT DOCUMENTS

CN 108768702 A 11/2018
CN 111242225 A 6/2020
(Continued)

OTHER PUBLICATIONS

Office Action for Chinese Patent Application No. 202080105939.8 dated Feb. 26, 2025, 8 pages.
(Continued)

*Primary Examiner* — Melvin H Pollack
(74) *Attorney, Agent, or Firm* — Sage Patent Group

(57) ABSTRACT

Methods and apparatus for root cause analysis. A method includes obtaining measurement data including measurements data of features of a system. The method further includes generating a prediction value by applying a trained machine learning model to the measurement data, and also generating feature impact values by applying a generated machine learning model explainer to the measurement data. The method further includes updating an ontological representation of connections between the features of the system and the prediction value using the generated feature impact values and, based on the updated ontological representation, outputting a proposed root cause that is responsible for the prediction value.

20 Claims, 13 Drawing Sheets

(56) References Cited

U.S. PATENT DOCUMENTS

| | | | |
|---|---|---|---|
| 9,774,506 | B2 | 9/2017 | Huang |
| 10,708,795 | B2* | 7/2020 | Tapia .................... G06Q 10/20 |
| 10,769,009 | B2* | 9/2020 | Luo ..................... G06F 11/0781 |
| 10,785,090 | B2* | 9/2020 | Vasseur .................. G06N 20/00 |
| 10,831,585 | B2* | 11/2020 | Gu ......................... G06N 20/00 |
| 10,966,108 | B2* | 3/2021 | Froehlich ............... G06N 3/042 |
| 11,093,518 | B1* | 8/2021 | Lu ....................... G06F 11/3476 |
| 11,176,464 | B1* | 11/2021 | Sagi ......................... G06N 7/01 |
| 11,188,411 | B1* | 11/2021 | Shen ..................... G06F 11/079 |
| 11,265,205 | B2* | 3/2022 | Umakanth ............ H04L 43/028 |
| 11,348,019 | B2* | 5/2022 | Rayes ..................... G06F 8/433 |
| 11,362,902 | B2* | 6/2022 | Arrabolu ............. H04L 41/0677 |
| 11,362,910 | B2* | 6/2022 | Lin ......................... H04L 41/28 |
| 11,366,842 | B1* | 6/2022 | Swaminathan ..... G06F 16/2477 |
| 11,416,325 | B2* | 8/2022 | Mann ..................... G06N 5/046 |
| 11,496,353 | B2* | 11/2022 | Chandrasekhar ... H04L 41/0823 |
| 11,501,238 | B2* | 11/2022 | Fletcher ........... G06Q 10/06393 |
| 11,544,621 | B2* | 1/2023 | Chen ....................... G06F 16/22 |
| 11,551,105 | B2* | 1/2023 | Walthers ................ H04L 41/16 |
| 11,616,682 | B2* | 3/2023 | Thampy .................. H04L 43/08 709/224 |
| 11,625,620 | B2* | 4/2023 | Singaraju ............... G06N 20/00 706/14 |
| 11,645,459 | B2* | 5/2023 | Galitsky ............... G06F 40/211 704/9 |
| 11,645,558 | B2* | 5/2023 | Wang ....................... G06N 5/04 706/12 |
| 11,663,523 | B2* | 5/2023 | Polleri ...................... G06F 8/30 706/12 |
| 11,671,312 | B2* | 6/2023 | Puri ........................ H04L 43/04 709/224 |
| 11,678,243 | B2* | 6/2023 | Huang .................. H04W 24/04 455/436 |
| 11,681,900 | B2* | 6/2023 | Oliner ................... G06F 16/254 707/738 |
| 11,693,924 | B2* | 7/2023 | Khorasgani ......... G06F 18/2323 700/110 |
| 11,695,619 | B2* | 7/2023 | Povoa ................... H04L 41/069 714/37 |
| 11,704,490 | B2* | 7/2023 | Sriharsha ............ G06F 16/3347 704/9 |
| 11,715,051 | B1* | 8/2023 | Baskaran ................. G06N 5/04 707/758 |
| 11,762,869 | B1* | 9/2023 | Werner ................. G06T 11/206 707/722 |
| 11,765,056 | B2* | 9/2023 | Morman ............. H04L 43/0876 709/202 |
| 11,818,145 | B2* | 11/2023 | Pan ........................ G06N 5/022 |
| 11,860,721 | B2* | 1/2024 | Kabbinale ........... G06F 11/0787 |
| 11,972,382 | B2* | 4/2024 | Sun ........................ G06N 5/022 |
| 11,973,777 | B2* | 4/2024 | Pi ........................... H04L 41/064 |
| 12,099,779 | B2* | 9/2024 | Kondejkar ........ G05B 19/41885 |
| 12,135,605 | B2* | 11/2024 | Garapati ............. G06F 16/9024 |
| 2010/0077077 | A1 | 3/2010 | Devitt |
| 2014/0321311 | A1 | 10/2014 | Groenendijk et al. |
| 2017/0364819 | A1* | 12/2017 | Yang ....................... H04L 41/16 |
| 2018/0308001 | A1 | 10/2018 | Doddala et al. |
| 2019/0132190 | A1 | 5/2019 | Jeyakumar et al. |
| 2020/0111009 | A1 | 4/2020 | Chattopadhyay et al. |
| 2020/0250559 | A1* | 8/2020 | Dinh .................. H04L 41/0631 |
| 2020/0267047 | A1 | 8/2020 | Safavi |
| 2021/0112101 | A1* | 4/2021 | Crabtree ............. H04L 63/1425 |
| 2023/0069074 | A1* | 3/2023 | Chen .................. G06F 11/3409 |
| 2025/0062951 | A1* | 2/2025 | Chen .................. H04L 41/0816 |

FOREIGN PATENT DOCUMENTS

| | | | | |
|---|---|---|---|---|
| JP | 7108674 | B2 * | 7/2022 | ............ G06F 11/079 |
| JP | 7461440 | B2 * | 4/2024 | ............ G05B 23/024 |
| JP | 2025019027 | A * | 2/2025 | ............ G06F 11/079 |
| WO | WO-2024006980 | A1 * | 1/2024 | ............ H04L 12/12 |
| WO | WO-2024255989 | A1 * | 12/2024 | ............ G06N 20/00 |

OTHER PUBLICATIONS

International Search Report and Written Opinion of the International Searching Authority, PCT/SE2020/050961, mailed May 28, 2021, 14 pages.

ELI5—Overview; accessed on the Internet on Mar. 19, 2023 at: https://eli5.readthedocs.io/en/latest/overview.html; 4 pages.

Ribeiro, Marco Tulio et al, "Why Should I Trust You?: Explaining the Predictions of Any Classifier," ACM SIGKDD International Conference on Knowledge Discovery and Data Mining (KDD), 2016; available at https://arxiv.org/abs/1602.04938, 10 pages.

Lundberg, Scott M., et al., "A Unified Approach to Interpreting Model Predictions;" NIPS Conference 2017, available at https://papers.nips.cc/paper/7062-a-unified-approach-to-interpreting-model-predictions, 10 pages.

3GPP TS 36.214 v9.1.0 (Mar. 2010); 3rd Generation Partnership Project; Technical Specification Group Radio Access Network; Evolved Universal Terrestrial Radio Access (E-UTRA); Physical layer; Measurements (Release 9); 14 pages.

* cited by examiner

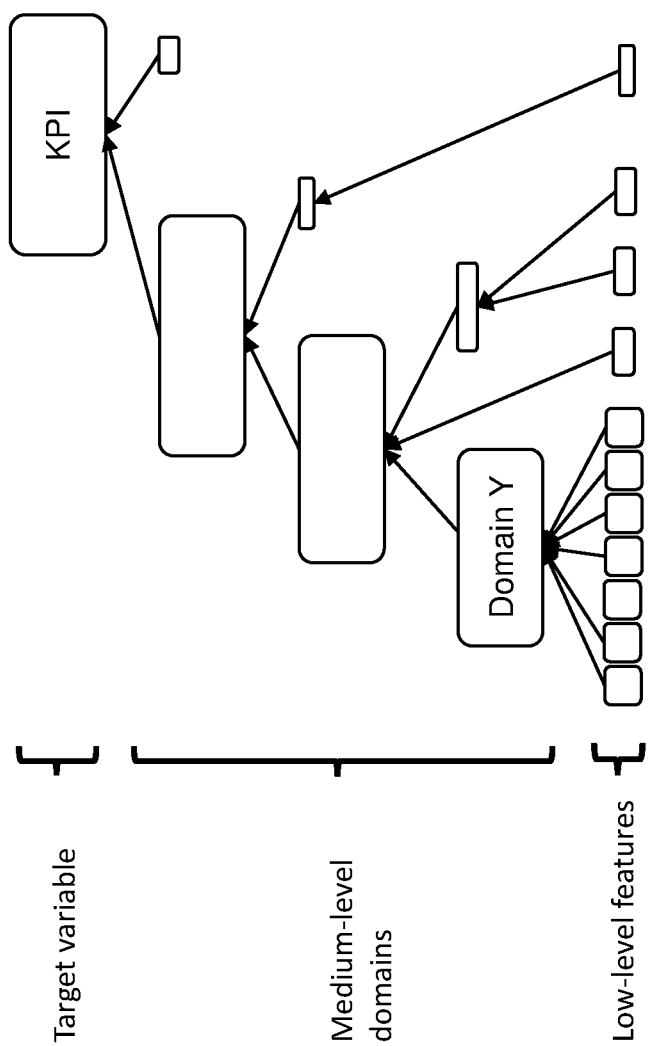

ROOT CAUSE ANALYSIS

CROSS REFERENCE TO RELATED APPLICATIONS

This application is a 35 U.S.C. § 371 national stage application of PCT International Application No. PCT/SE2020/050961 filed on Oct. 8, 2020, the disclosure and content of which is incorporated by reference herein in its entirety.

TECHNICAL FIELD

Embodiments described herein relate to methods and apparatus for root cause analysis, in particular methods and apparatus applying machine learning techniques to root cause analysis.

BACKGROUND

Determining how complex systems are performing, and why, is typically a time consuming and labour intensive task that often requires a substantial amount of work from system experts. An example of a complex system in this context is a telecommunications or telecoms network; the performance of telecoms networks (such as mobile telecoms networks) may be assessed by evaluating the quality of experience for end-users of the network, also referred to as network customers.

Customer Experience Management (CEM) can be challenging for operators of mobile telecomm networks. In order to provide Service Assurance (SA), that is, service satisfying various quality standards (examples may include a minimum level of data throughput, a maximum rate of calls dropped, and so on), for end-users typically requires end-to-end observability of the services. Network management through many domains may also be required.

FIG. 1 is a schematic overview of a general end-to-end telecoms network CEM architecture where low-level network measurement data features (e.g. logs, traces, probes, counters, measurement reports, etc.) are streamed to a central management entity (which may be a core network node, for example). The features may come from many different network domains, for example the User Equipment (UE), Radio Access Network (RAN), Core Network, Transport Network, Services, and so on. In order to identify relevant data related to a given mobile subscriber, it is necessary to correlate measurements collected from multiple domains, such that an operator can monitor the main characteristics and performance of end user sessions. The complexity of network management data is increased as the diverse measurement data from multiple domains may also relate to multiple access technologies, network layers and protocols. Additionally, some relevant data may not be accessible for network management as a particular network domain may be managed by a 3rd party (such as over-the-top services, transport services, and so on).

The performance of a network may be summarised using Key Performance Indicators (KPIs); using the example of a telecoms network, examples of KPIs may include packet loss ratios, latency, and so on. KPIs may be monitored directly or estimated; returning to the example of telecoms networks, telecom KPIs may be monitored directly or estimated using low-level network measurement data such as that illustrated in FIG. 1.

In order to perform more in-depth analysis of end user sessions, further analytics is required. By manually analysing correlated measurements from multiple domains, access technologies, and so on, a network operator may obtain high-level insights and may be able to determine potential actions to perform on the network in case of poor network performance and/or network performance degradation.

Root cause analysis (RCA) is the process of identifying the main source of the problem or performance degradation; typically, this process is performed by a skilled operator using knowledge of the network, KPIs and low-level network measurement data. After finding a root cause of a problem/performance degradation, the operator may potentially take further actions to fix the problem and/or modify the network to reduce the risk of similar problems reoccurring. In order to reduce the burden on operators resulting from performing RCA, Machine Learning (ML) techniques may be used to assist an operator by performing high-level analytics in network management, however a substantial burden on operators remains.

U.S. Pat. No. 9,774,506 B2 discloses how causal relations between events may be explored based on time sequence order of different events/event bursts. The system uses a bottom-up approach in which bursts of events are detected, and causal relationships between events and system operation reports are identified based on detected event burst records representing the occurrence of burst behaviours in events. Based on the causal relationships found, causes of a change in system operation may be identified by determining parameters associated with events of an event burst relevant to the change in system operation. The impacts of the events and correlations between events are not considered, and there is no scope for feature aggregation.

SUMMARY

It is an object of the present disclosure to provide a method, apparatus and computer readable medium which at least partially address one or more of the challenges discussed above. In particular, it is an object of the present disclosure to provide root cause analysis methods and apparatuses that are capable of operating with complex data sets, that require minimal amounts of human input, and that take into account causal links between data.

According to an aspect of an embodiment there is provided a method for root cause analysis. The method comprises obtaining measurement data comprising measurements data of features of a system, generating a prediction value by applying a trained ML model to the measurement data. The method further comprises generating feature impact values by applying a generated ML model explainer to the measurement data. The method also comprises updating an ontological representation of connections between the features of the system and the prediction value using the generated feature impact values, and outputting a proposed root cause based on the updated ontological representation, wherein the proposed root cause is responsible for the prediction value. The use of the trained ML model in conjunction with the model explainer and ontological representation allows root causes of prediction values to be identified with minimal human input. The root causes may then be used to identify and address potential system issues, and improve system performance.

In some aspects of embodiments, the ontological representation may be a knowledge graph. The knowledge graph may have a static structure, and may represent causal relationships between measurement data of features, domains and prediction values. Knowledge graphs are particularly well suited to representing causal relations in complex systems, and the use of static structures for knowledge graphs may ensure that expert system knowledge used in the preparation of a knowledge graph may be retained. The knowledge graph may therefore accurately represent a system.

In some aspects of embodiments, the method may comprise training the ML model and/or generating the ML model explainer, potentially in parallel. The creation of the ML model and/or model explainer may thereby be undertaken as efficiently as possible.

In some aspects of embodiments, the system may be at least a part of a telecommunications network, the prediction value may be a KPI value (such as VoLTE MOS), and the measurement data of features may be telecommunications network metrics. Aspects of embodiments may be particularly well suited to providing root cause information for complex systems such as telecommunications networks.

In some aspects of embodiments, the method may further comprise suggesting an action to address the proposed root cause, and potentially performing the action on the system. In this way, potential issues with systems may be identified and resolved swiftly with minimal human input required.

According to further aspects of embodiments there are provided root cause analysers for root cause analysis. The root cause analyser comprises processing circuitry and a memory containing instructions executable by the processing circuitry. The root cause analyser is operable to perform a method comprising obtaining measurement data comprising measurements data of features of a system, and generate a prediction value by applying a trained machine learning, ML, model to the measurement data. The root cause analyser is further configured to generate feature impact values by applying a generated ML model explainer to the measurement data. The root cause analyser is also configured to update an ontological representation of connections between the features of the system and the prediction value using the generated feature impact values, and output a proposed root cause, based on the updated ontological representation, wherein the proposed root cause is responsible for the prediction value. Some of the advantages provided by the root cause analyser may be as discussed above in the context of the method for root cause analysis.

BRIEF DESCRIPTION OF DRAWINGS

The present disclosure is described, by way of example only, with reference to the following figures, in which:—

FIGS. 7A and 7B are schematic representations of root cause identifications;

DETAILED DESCRIPTION

Figure 1:
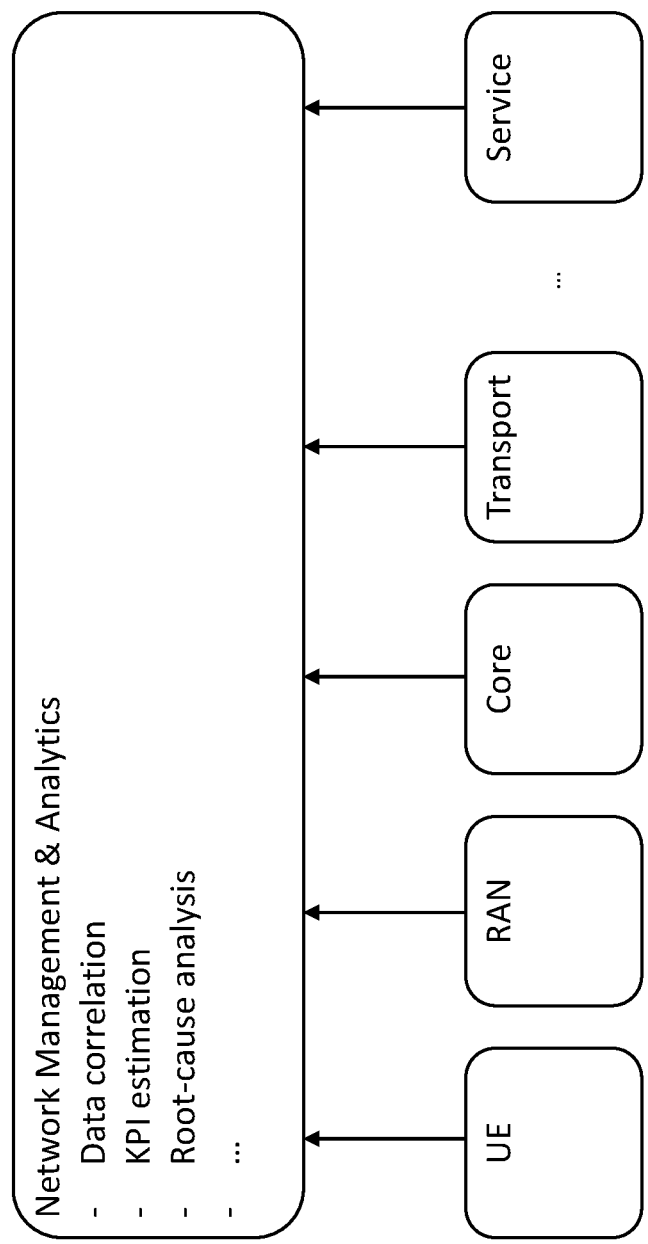
FIG. 1 is a schematic overview of a telecoms network CEM architecture.

For the purpose of explanation, details are set forth in the following description in order to provide a thorough understanding of the embodiments disclosed. It will be apparent, however, to those skilled in the art that the embodiments may be implemented without these specific details or with an equivalent arrangement.

As mentioned above, ML techniques may assist an operator in performing RCA. However, typically ML systems operate as "black box" systems, in which the way a particular output is generated by a ML agent when given a particular input is not known. As a result, typical ML systems can provide some assistance to an operator performing RCA, but the scope of the assistance is limited. If a ML agent is to be used to predict KPI values, then in order to identify which features contribute to the predicted KPI value and the magnitude of the contribution from each feature (information which may be useful for RCA), a ML model explainer may be used.

ML model explainers are used to identify why a ML model returns a given output when provided with given inputs. Examples of ML model explainers include the Eli5 package (discussed in greater detail at https://eli5.readthedocs.io/en/latest/overview.html as of 11 Sep. 2020) and the LIME (Local Interpretable Model-agnostic Explanations) method (discussed in greater detail in ""Why Should I Trust You?": Explaining the Predictions of Any Classifier" by Ribeiro, M. T., Singh, S. and Guestrin, C.; ACM SIGKDD International Conference on Knowledge Discovery and Data Mining (KDD), 2016; available at https://arxiv.org/abs/1602.04938 as of 29 Sep. 2020). An additive ML model explainer referred to as SHAP (SHapley Additive exPlanations) is discussed in greater detail in "A Unified Approach to Interpreting Model Predictions" by Lundberg, S. M. and Lee, S I, NIPS Conference 2017, available at https://papers.nips.cc/paper/7062-a-unified-approach-to-interpreting-model-predictions as of 11 Sep. 2020.

Using ML model explainers the most relevant features contributing to a predicted KPI value may be identified. While the use of a ML model explainer may allow RCA in some simple systems, in complex systems such as telecoms networks the features of the telecoms network are often highly interrelated. One specific problem or KPI degradation can be indicated by multiple features, thus it is not easy to find the root cause of the problem/degradation as causal relationships may not be identified. Detailed system knowledge may be required in order to obtain causal relationships.

Embodiments of the present disclosure provide methods and apparatus for at least partially automating RCA through the use of ML models with ML model explainers, in conjunction with ontological representations. Ontological representations may be used to represent a knowledge base relating to a system, indicating causal relationships between features and higher level values (derived from features). Typically, ontological representations are initially compiled with the assistance of one or more system experts, and are a representation of the knowledge base of the one or more experts relating to a given system. An example of an ontological representation which may be used is a knowledge graph.

Knowledge graphs essentially represent multiple statements (forming a knowledge base) in a graphical form. In knowledge graphs, a collection of entities and predicates are represented, usually in the form of a multi-dimensional plot. Relationships between entities (predicates) can be illustrated using links between the entities. In some knowledge graphs, the relative positioning of the entities and links on the knowledge graph may be used to illustrate relationships between different entities and links.

According to aspects of embodiments, a ML model is used to generate a prediction value indicative of a performance provided to an end-user (for example, a predicted KPI value) from low-level features (for example, network metrics as illustrated in FIG. 1). A ML model explainer is used to generate an impact value for each feature for each individual sample. A ML model explainer, preferably an additive ML model explainer such as SHAP, as discussed above, may be used. An ontological representation, such as a knowledge graph, encoding causal relationships between features and higher-level domains is then updated using the generated feature impact values. As discussed above, the structure of the ontological representation is defined by one or more human experts in advance, using the knowledge base of the expert(s); this structure may be fixed. Based on the updated ontological representation, a proposed root cause for a prediction value may then be identified and output.

Where the ontological representation is a knowledge graph, the generated feature impact values may be assigned to low level nodes of knowledge graph (which may be referred to as leaf nodes, particularly where the knowledge graph has a tree shape). The impact of a given higher level domain of the knowledge graph may then be determined by iteratively summing the impact values of low level nodes connected to the given higher level domain; this process is simplified if an additive ML model explainer is used. Once this process has been implemented across the higher level domains, the root cause or causes of a prediction value can be identified based on the relative impact values of the domains. The operation of some aspects of embodiments is discussed in greater detail below.

According to aspects of embodiments, RCA may be performed with reduced operator input required. Aspects of embodiments may be capable of operating using complex datasets, such as those derived from telecoms networks, vehicular traffic management systems, web services, cloud data services, and so on. The use of ontological representations allows causal relationships to be investigated, and also facilitates the incorporation of system expert knowledge.

Figure 2:
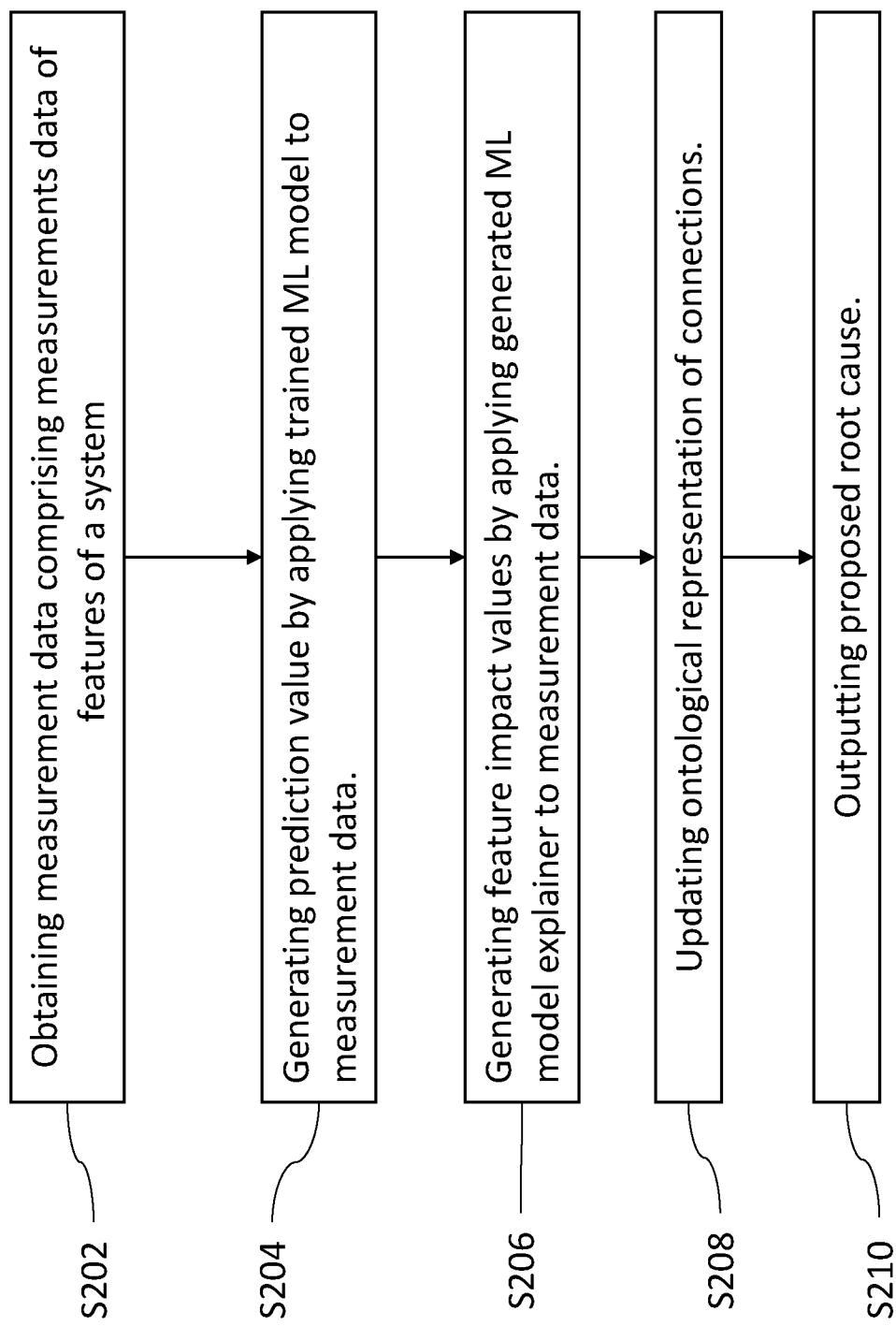
FIG. 2 is a flowchart of a method in accordance with aspects of embodiments.

A method in accordance with aspects of embodiments is illustrated in the flowchart of FIG. 2. The method may be executed by any suitable apparatus. Examples of suitable apparatuses in accordance with aspects of embodiments that are suitable for executing the method are shown schematically in FIG. 3A and FIG. 3B. One or more of the apparatuses shown in FIGS. 3A and 3B may be incorporated into a system, for example, where the system is all or part of a telecommunications network, one or more of the apparatuses used to execute the method may be incorporated into a base station, core network node or other central management entity.

Figure 3A:
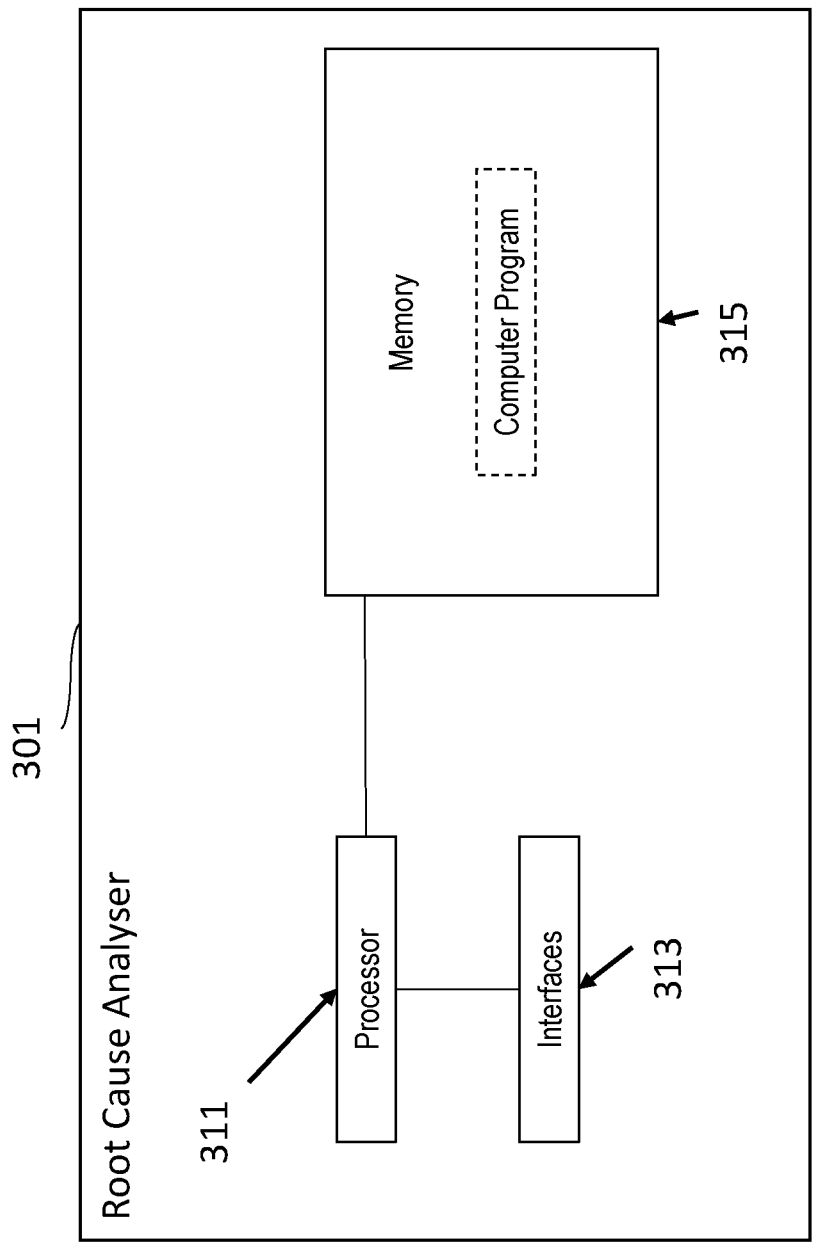
FIGS. 3A and 3B are schematic diagrams of systems in accordance with aspects of embodiments.
Figure 3B:
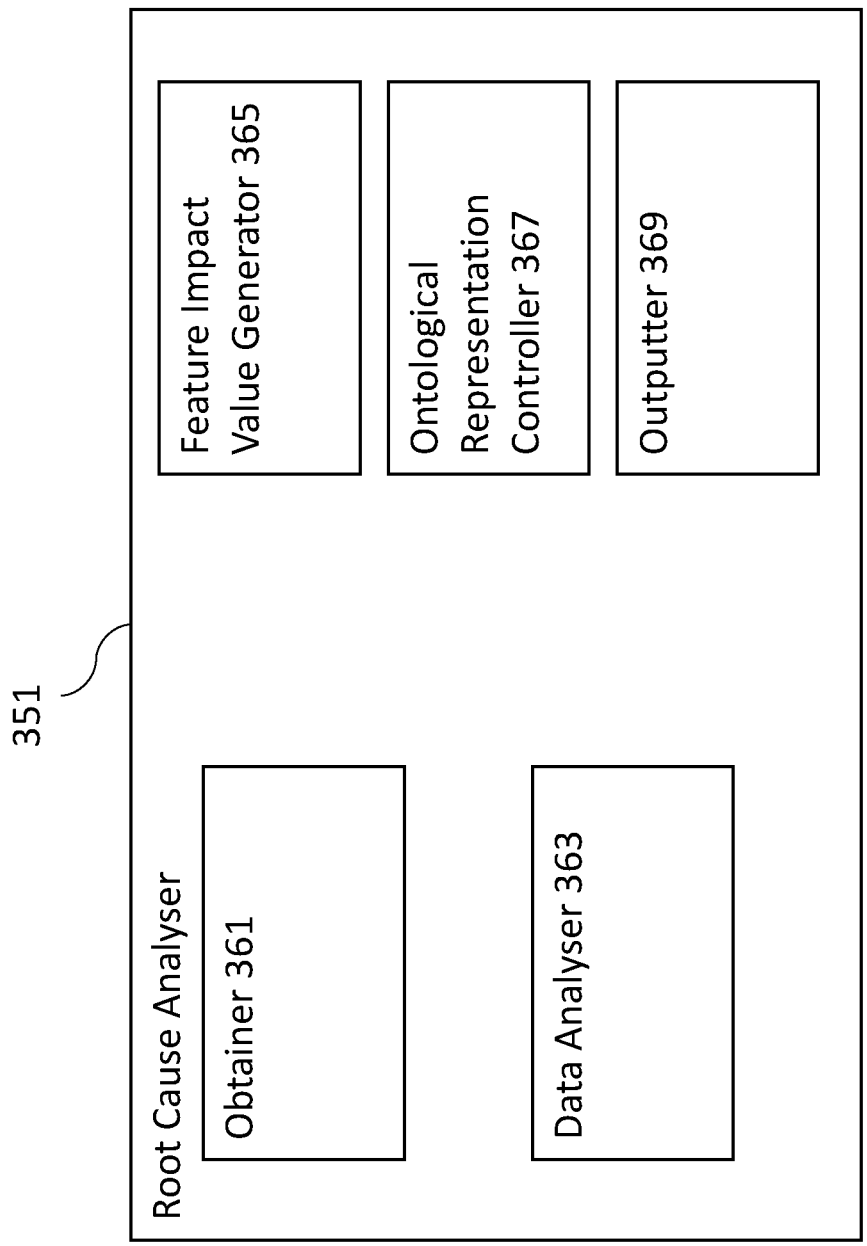

As shown in step S202 of FIG. 2 the method comprises obtaining measurement data comprising measurements data of features of a system. As discussed above, the feature measurement data may be obtained from multiple sources; using the example of a telecommunications network the feature data may be telecommunication network metrics obtained from multiple domains. Where a root cause analyser 301 in accordance with the aspect of an embodiment shown in FIG. 3A is used, the feature measurement data may be obtained in accordance with a computer program stored in a memory 315, executed by a processor 311 in conjunction with one or more interfaces 313. Alternatively, where a root cause analyser 351 in accordance with the aspect of an embodiment shown in FIG. 3B is used, the feature measurement data may be obtained by the obtainer 361. Once received, the measurement data may be stored in a database; the memory 315 of FIG. 3A or a memory incorporated into or accessible to the obtainer 361 may be used for this purpose. The measurement data may be collated by a further component, for example a component forming part of or separate to root cause analyser 301, 351, and received in one or more batches. Alternatively, the measurement data may be received directly following measurement with no collating.

The received measurement data is then passed to a trained machine learning (ML) model to generate a prediction value, as shown in step S204 of FIG. 2. Any suitable ML model may be used, for example, a neural network, boosted decision tree, and so on. The choice of ML mode may be dictated by a choice of ML model explainer (discussed in greater detail below) and/or by suitability to model a desired system. In some aspects of embodiments the ML model may be trained prior to or simultaneously with obtaining the measurement data. The ML model may be trained using training data which is expected to be similar to the obtained measurement data, optionally this training data may be feature measurement data that has previously been obtained. Any suitable training method may be used; suitable ML training methods are well known to those skilled in the art.

Where a root cause analyser 301 in accordance with the aspect of an embodiment shown in FIG. 3A is used, the prediction value may be generated in accordance with a computer program stored in a memory 315, executed by a processor 311 in conjunction with one or more interfaces 313. Alternatively, where a root cause analyser 351 in accordance with the aspect of an embodiment shown in FIG. 3B is used, the prediction may be generated by the data analyser 363. The ML model may form part of a root cause analyser 301, 351, for example may form part of a data analyser 363. Alternatively, the ML model may be accessible by the root cause analyser 301, 351, but not form a part of said root cause analyser 301, 351.

The trained ML model generates a prediction value, which may be a numerical value indicating a property of the system. Using the example implementation system of a telecommunications network, the prediction value may be a KPI value, such as a packet loss ratio, latency value, or Voice over Long Term Evolution (LTE) Mean Opinion Score (VoLTE MOS), for example. All of the example KPIs listed above use numerical scales, for example packet loss ratios use a numerical scale with limits of 0 and 1, and VoLTE MOS uses a numerical scale with limits of 1 and 5. If the prediction value relates to a measure which is not typically measured using a numerical scale, the measure may be converted so as to use a numerical scale.

In addition to applying the trained ML model to the measurement data to generate a prediction value, the method further comprises applying a generated ML model explainer to the measurement data to generate feature impact values, as show in step S206. The feature impact values are a measure of to what extent each of the features for which measurement data is input influence the prediction value generated by the ML model. Where a root cause analyser 301 in accordance with the aspect of an embodiment shown in FIG. 3A is used, the feature impact values may be generated in accordance with a computer program stored in a memory 315, executed by a processor 311 in conjunction with one or more interfaces 313. Alternatively, where a root cause analyser 351 in accordance with the aspect of an embodiment shown in FIG. 3B is used, the feature impact values may be generated by the feature impact value generator 365. The ML model analyser may form part of a root cause analyser 301, 351, for example may form part of a feature impact value generator 365. Alternatively, the ML model analyser may be accessible by the root cause analyser 301, 351, but not form a part of said root cause analyser 301, 351.

The feature impact values are numerical values; typically the feature impact values may be positive where a feature has a beneficial effect on a prediction value and negative where the feature has a detrimental effect on a prediction value. Taking the example of a telecommunications network, where the prediction value is a packet loss ratio (a KPI), the network metric of the reference signal receive power (RSRP) of a serving cell may be positive if above a certain average performance value as a high serving cell RSRP would reduce packet losses, or negative if below a certain average performance value as a low serving cell RSRP would increase packet losses. What constitutes a positive metric and what constitutes a negative metric is determined dependent upon a specific system configuration, and may be determined using system expert knowledge.

Figure 4:
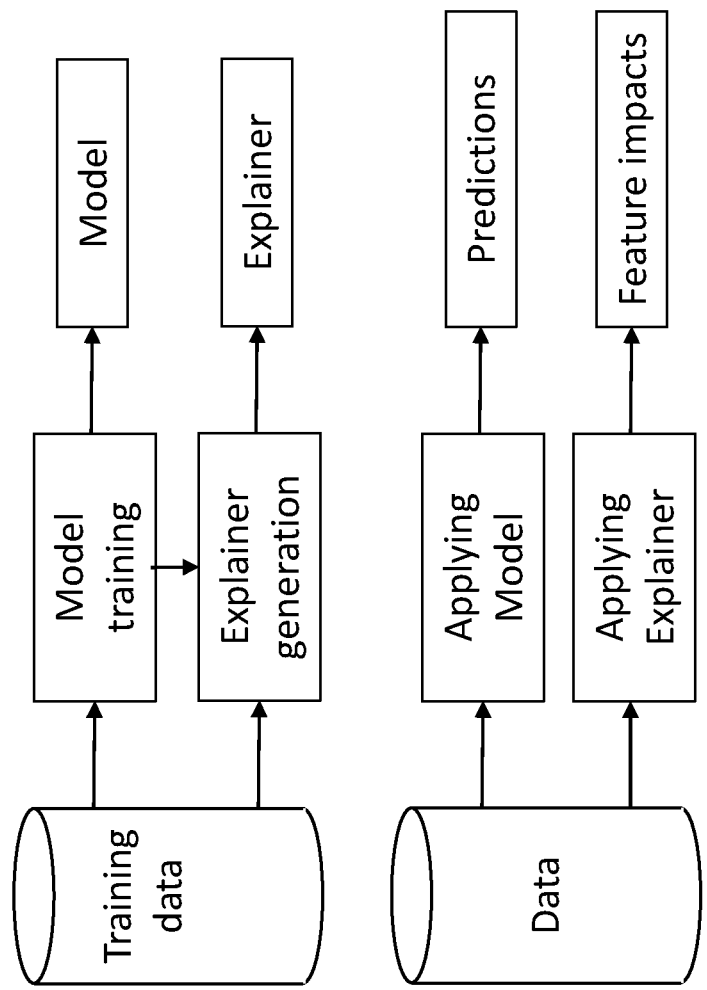
FIG. 4 is a schematic overview of the training/generation of a ML model and ML model explainer in accordance with aspects of embodiments.

In some aspects of embodiments the ML model explainer may be generated by the root cause analyser prior to being used to generate feature impact values. The ML model explainer may be generated using training data, which may be the same training data as is used to train the ML model (as discussed above). The training of the ML model may also be a factor in the generation of the ML model explainer. A schematic overview of the training/generation of a ML model and ML model explainer, and subsequent use of the ML model and ML model explainer, is shown in FIG. 4. As illustrated in FIG. 4, the same training data may be used for the ML model training and ML model explainer generation, or different data may be used. The process results in the trained ML model and generated ML model explainer. The ML model training and ML model explainer generation may be performed in parallel (using different hardware), or may be performed consecutively using the same hardware. Typically the ML model training is at least begun before the ML model explainer generation begins, as the ML model is a factor in the ML model explainer generation. The trained ML model and generated ML model explainer may then be applied to feature measurement data to obtain predictions and feature impact values respectively.

Figure 5:
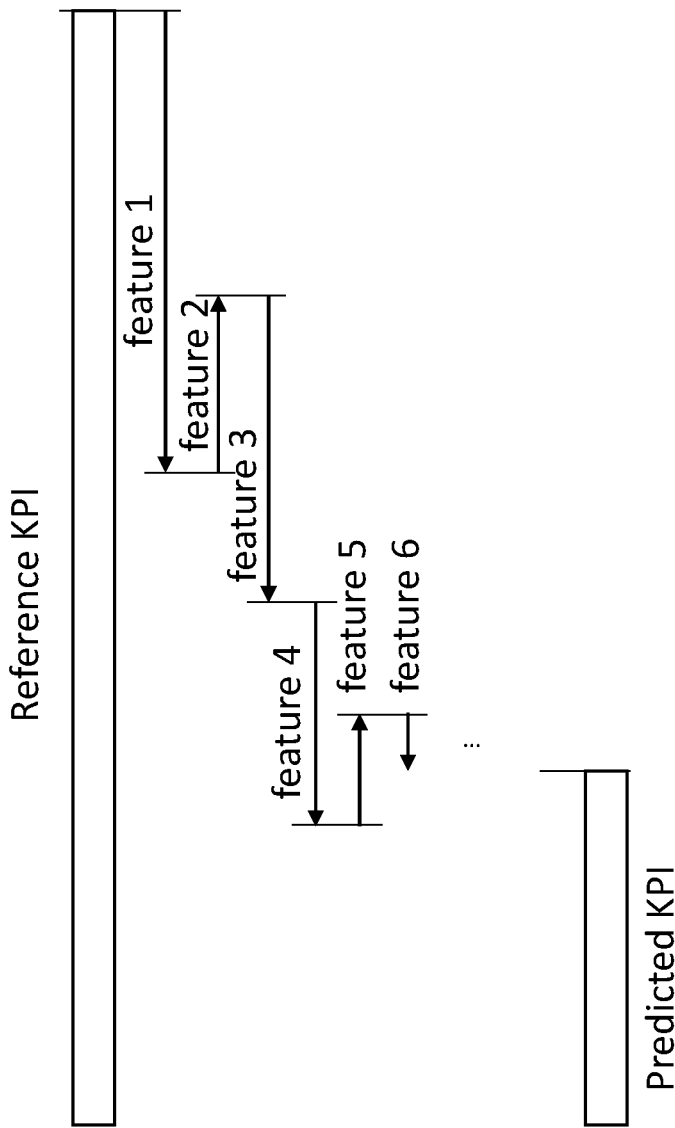
FIG. 5 is an illustrative diagram indicating how a prediction value may be obtained.

FIG. 5 is an illustrative diagram indicating how a prediction value (in this example a KPI value) may result from the respective impact values of a number of features. In the example illustrated by FIG. 5, the predicted KPI value is lower than the average (reference) KPI value. Feature 1 and feature 3 have the largest negative impact values and thereby contribute most to the KPI degradation. By contrast, feature 2 and feature 5 have small positive impact. The feature impact values shown in FIG. 5 are generated by a ML model explainer. Additive ML model explainers (such as SHAP) are particularly well suited, as multiple features can be grouped together and the feature impact value of the composite feature is determined by simply adding up the feature impact values of the individual features. Where ML model explainers that are not additive are used, the process for obtaining feature impact values for composite features may be complicated.

The method further comprises updating an ontological representation of connections between the features and the prediction value using the generated feature impact values, as shown in S208 of FIG. 2. Where a root cause analyser 301 in accordance with the aspect of an embodiment shown in FIG. 3A is used, the ontological representation may be updated in accordance with a computer program stored in a memory 315, executed by a processor 311 in conjunction with one or more interfaces 313. Alternatively, where a root cause analyser 351 in accordance with the aspect of an embodiment shown in FIG. 3B is used, the ontological representation may be updated by the ontological representation controller 367. The ontological representation may form part of a root cause analyser 301, 351, for example may form part of an ontological representation controller 367. Alternatively, the ontological representation may be accessible by the root cause analyser 301, 351, but not form a part of said root cause analyser 301, 351.

Some aspects of embodiments further comprise generation of the ontological representation, for example, using a knowledge base of expert knowledge relating to a given system. In some aspects of embodiments the ontological representation may be a knowledge graph; knowledge graphs can be particularly well suited to representing knowledge relating to certain systems, such as telecommunication systems. Where the ontological representation is a knowledge graph, the structure of the knowledge graph may be static, such that the nodes and edges (links between nodes) are fixed but the respective weights of nodes and edges can vary. A static structure may be particularly well suited to representing some systems, with edges representing defined causal relationships between nodes. Alternatively, knowledge graphs with dynamic structures in which edges can be created and deleted based on data may be more appropriate for some systems.

Figure 6:
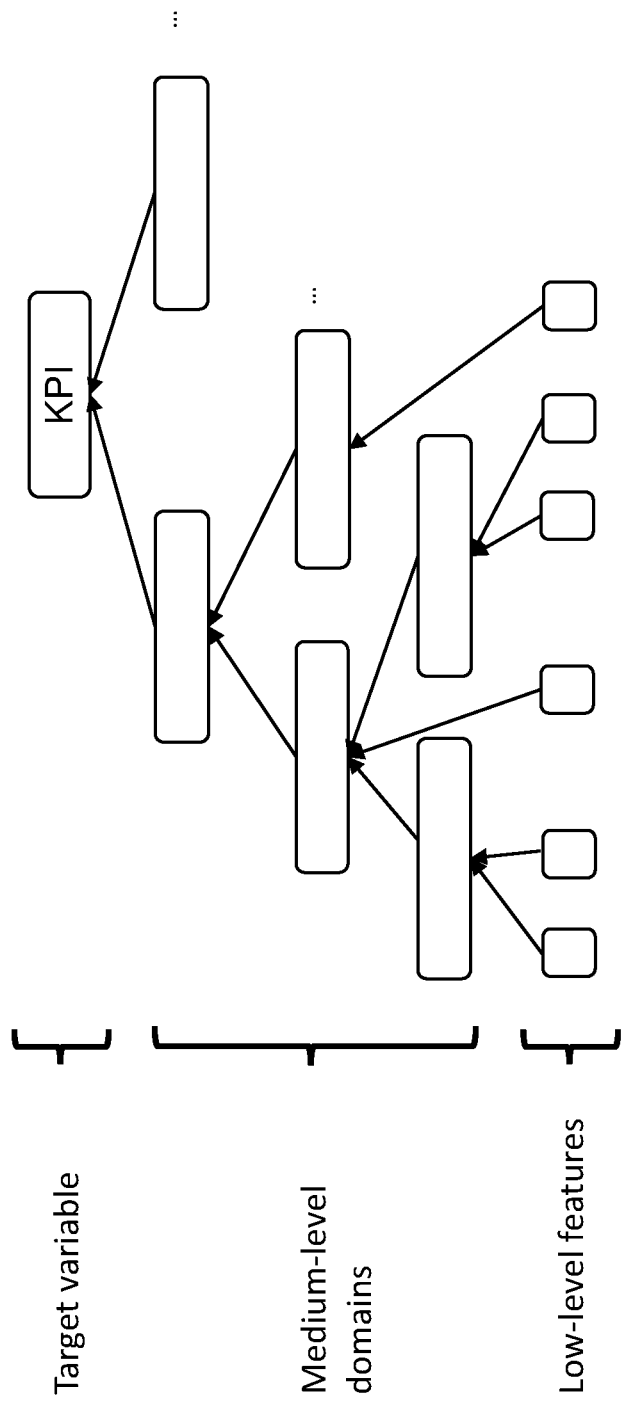
FIG. 6 is a representation of an example of a knowledge graph in accordance with an aspect of an embodiment.

An example of a knowledge graph in accordance with an aspect of an embodiment is shown in FIG. 6. In the example of FIG. 6, a knowledge graph structure related to a telecommunication network end-user session is shown. Causal relations between KPIs and network parameters are set up. In addition to the KPI and the low-level features there are medium-level domains representing different network domains and subdomains. The edges illustrate dependency, for example, the KPI depends on the subdomains with arrows pointing to the KPI, and these subdomains might be the cause of KPI problems. These subdomains can then further depend on other lower level subdomains and so on. The lowest level of the graph (leaves) contains the features, in this case telecommunication network metrics, for which measurement data is obtained. The knowledge graph in FIG. 6 shows a system in which each feature (for which measurement data is obtained) directly impacts only a single domain; indicated by the single arrow originating from each of the lowest level features. In other aspects of embodiments, a single feature may directly impact plural domains, and this would be indicated graphically as a plurality of arrows originating from a single feature and terminating in different domains.

Once the ontological representation has been updated with the feature values generated by the ML model explainer, the ontological representation can then be used to identify the proposed root cause of prediction values which are worse than expected. The proposed root cause may then be output, as shown in step S210. Where a plurality of root causes are collectively responsible for a prediction value, these plural root causes may be output. Where a root cause analyser 301 in accordance with the aspect of an embodiment shown in FIG. 3A is used, the root cause(s) may be output in accordance with a computer program stored in a memory 315, executed by a processor 311 in conjunction with one or more interfaces 313. Alternatively, where a root cause analyser 351 in accordance with the aspect of an embodiment shown in FIG. 3B is used, the root cause(s) may be output by the outputter 369.

Using an example where the system is a telecommunications network, the ML model may predict a VoLTE MOS value (a KPI commonly used for telecommunication networks) of 2 when a value of 4 is expected. The ontological representation may indicate that the root cause of the worse than expected VoLTE MOS value is worse than usual SINR values (which may be caused, for example, by atmospheric interference). In some aspects of embodiments, the method may further comprise suggesting an action to address the proposed root cause (or causes), and outputting this suggested action. Using the example of worse than usual SINR values, a proposal to boost signal transmission powers to help improve the SINR may be made. The suggestions may be taken from a database of potential root causes associated with solutions, which may be accessible from or part of a root cause analyser. In some aspects of embodiments the method may also comprise implementing a suggested action, that is, performing the action on the system. With reference to the example, above, the root cause analyser may trigger the sending of a signal instructing an increase in transmission powers. Root cause analysers which perform the action may reduce delays in the action being performed, and may be particularly suitable in situations wherein the root cause analyser forms part of the system (for example, where the system is a telecommunications network and a root cause analyser 301, 351 is incorporated within a core network node).

Figure 7A:
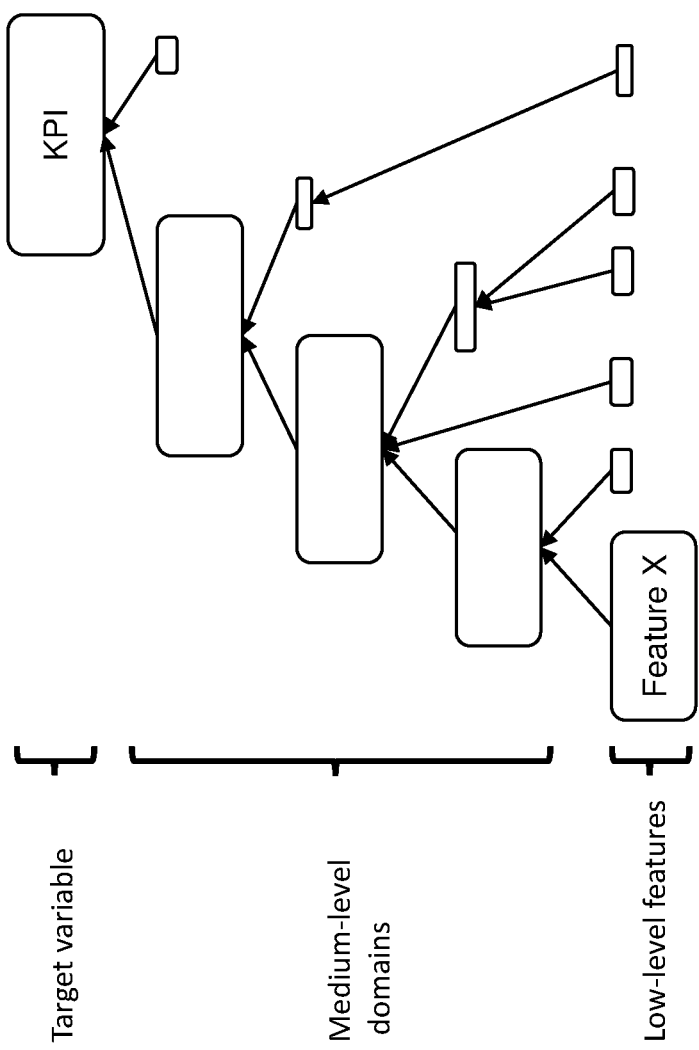

The root cause or causes outputted may be a single feature or plural features, and/or may be a single domain or plural domains. FIG. 7A is a schematic representation of a situation wherein a single feature is the root cause of a problem (indicated by a predicated low KPI), and FIG. 7B is a schematic representation of a situation wherein a single domain is the root cause of a problem. In FIG. 7 the relative sizes of the boxes in the figures is representative of impact value (for simplicity, all of the features and domains in FIG. 7 have negative impact values). In FIG. 7A, it can clearly be seen that Feature X has a larger impact value than any of the other low level features. This large impact value propagates up the levels of the knowledge graph; via the causal link to medium level domains and ultimately to the top of the graph (where the target variable, a KPI, is located). In this instance, Feature X would be outputted as the root cause. By contrast, in FIG. 7B Domain Y has a larger impact value than other domains of equivalent level. The large impact value of Domain Y is not due to any single low level feature, but is instead the result of contributions from a number of low level features (as shown in FIG. 7B). In this instance, Domain Y would be outputted as the root cause.

Figure 8A:
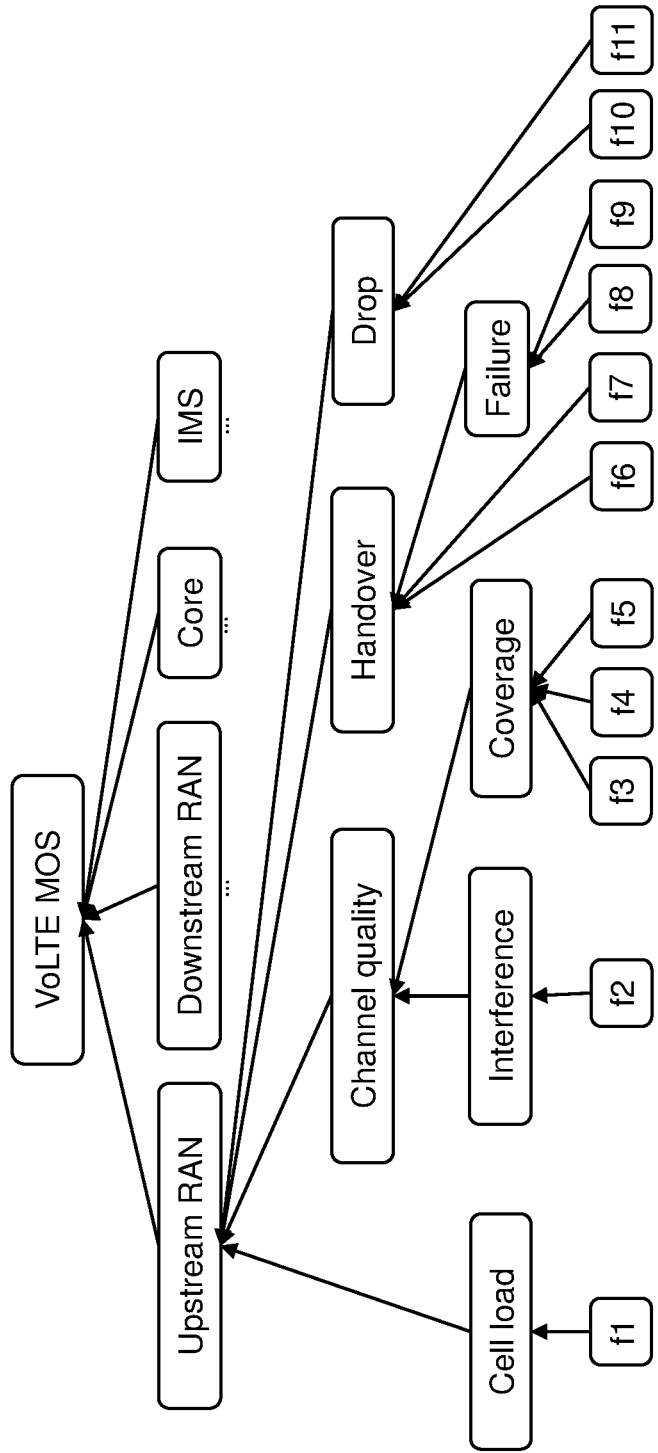
FIGS. 8A and 8B are representations of examples of knowledge graphs in accordance with aspects of embodiments.

FIG. 8A shows a knowledge graph which may be generated in an aspect of an embodiment wherein the system is a telecommunications network and the prediction value is a VoLTE MOS value. With reference to the diagram in FIG. 6, the low level features in the knowledge graph of FIG. 8A are network metrics. In FIG. 8A, the low level features are labelled as f1 to f11; examples of network metrics which may be represented by each of f1 to f11 are shown in Table 1. Other network metrics may also be suitable. Examples of some network metric which may be used in aspects of embodiments are discussed in "Evolved Universal Terrestrial Radio Access (E-UTRA); Physical layer—Measurements" by 3GPP, TS 36.214 v 9.1.0, available at https://www.etsi.org/deliver/etsi_ts/136200_136299/136214/09.01.00_60/ts_136214v090100p.pdf as of 29 Sep. 2020.

TABLE 1

| Low level feature | Example network metric |
| --- | --- |
| f1 | PRB (Physical Resource Block) Utilization |
| f2 | SINR (Signal to Interference and Noise Ratio) |
| f3 | RSRP (Reference Signal Received Power) |
| f4 | RSRQ (Reference Signal Received Quality) |
| f5 | RSSI (Received Signal Strength Indicator) |
| f6 | Neighbor RSRP |
| f7 | Number of Modify Bearer Requests |
| f8 | Number of Unsuccessful Bearer Modification events |
| f9 | Number of Unsuccessful UE Context Release events |
| f10 | Number of S1 Interface Down events |
| f11 | Number of RRC Reconfiguration Timeout events |

The KPI is the VoLTE MOS (Voice over LTE Mean Opinion Score) that directly depends on the performance of Upstream RAN, Downstream RAN, Core Network and IP Multimedia Subsystem. In FIG. 8A only the low level features and medium level domains causally linked to the high level domain "Upstream RAN" are shown in full. The low level features and medium level domains causally linked to the domains "Downstream RAN", "Core" (network) and "IMS" (IP Multimedia Subsystem) are not shown, for clarity.

Figure 8B:
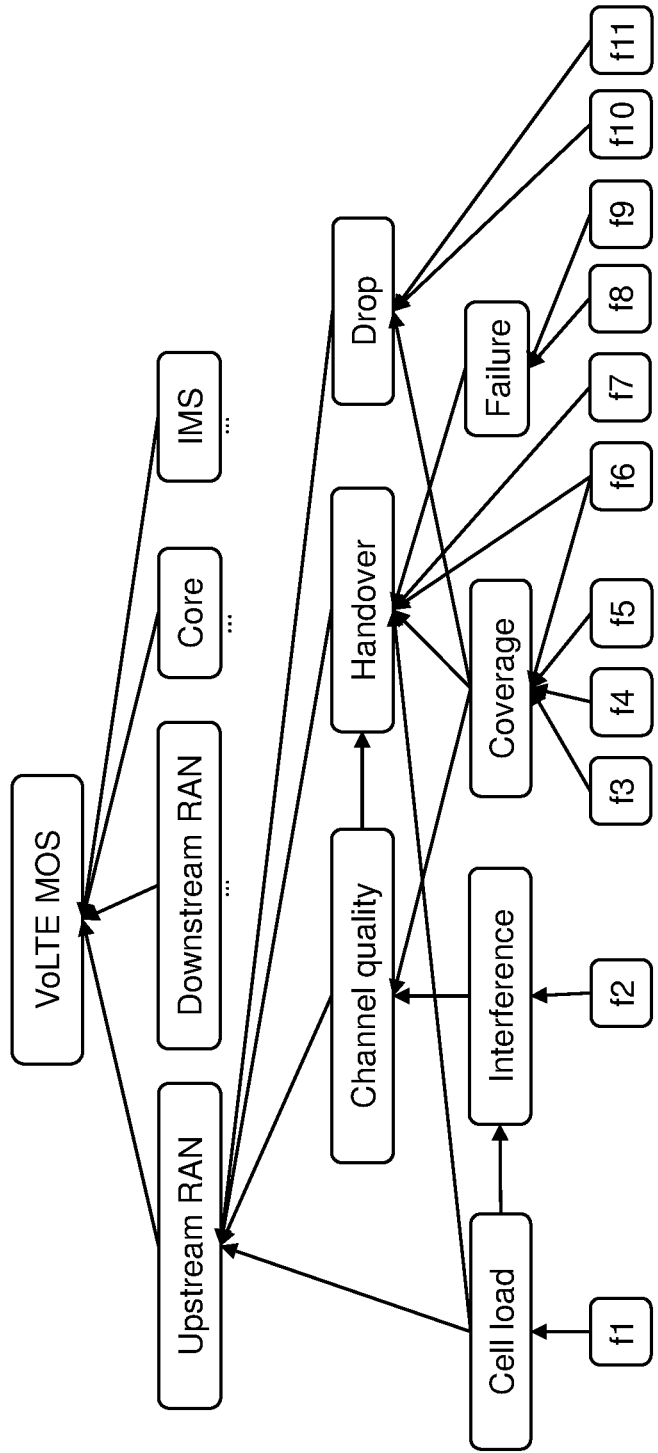

In FIG. 8A, each low level feature is causally linked to a single medium level domain (by an edge), each domain is causally linked to a single domain of a higher level, and so on. An alternative knowledge graph is shown in FIG. 8B. The knowledge graph in FIG. 8B includes causal links from some features to multiple domains (see feature f6, for example), from domains in a level to plural higher level domains (see "Coverage", for example") and between domains in a single level (see "Channel Quality"). In order to account for differing influences of features/domains on domains to which they are causally linked, the edges forming the causal links may be weighted accordingly. As an example of this, if feature f6 has a small influence on the value of "Coverage", but a larger influence on the value of "Handover", the edge from f6 to "Coverage" may be given a smaller weight than the edge to "Handover". The weights may be normalised to ensure consistency in the calculations, such that the weight of all edges from a single feature equal 1. As an example of this, if both the edges starting from Cell load get weight 0.5 then Upstream RAN's weight is calculated as 0.5 W(cell_load)+W(channel_quality)+W(handover)+W(drop).

Figure 9:
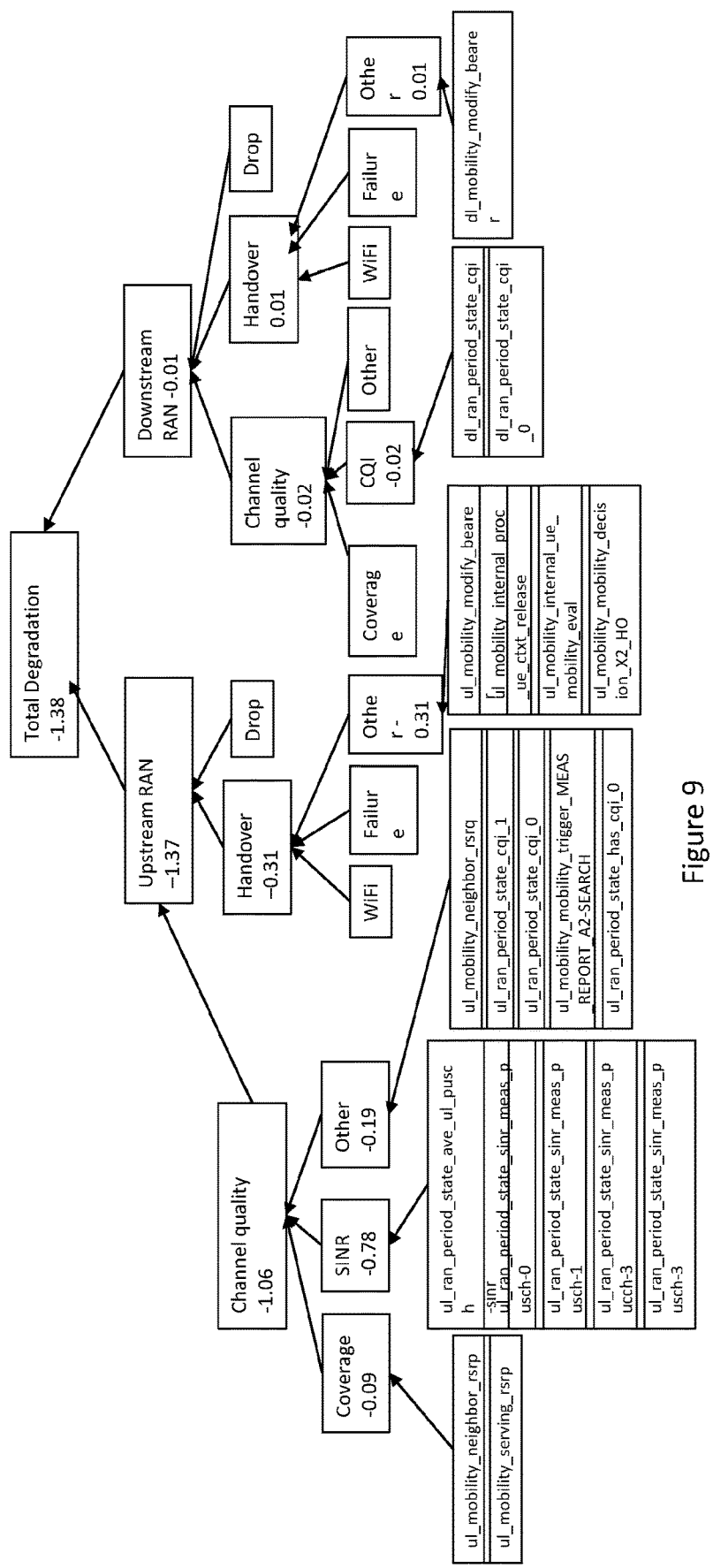
FIG. 9 is an example of results obtained using a method in accordance with aspects of embodiments.

FIG. 9 is an example of results obtained using a method in accordance with aspects of embodiments. In the FIG. 9 example, a predicted value for the KPI VoLTE MOS is obtained for a telecommunications network; the predicted value is 1.38 below the expected value (as shown by the value of "−1.38" for the "Total Degradation" in FIG. 9), indicating a KPI degradation. In the example, only the contributions to the KPI value from the Upstream RAN and Downstream RAN domains are shown, for clarity. The numbers in the boxes representing domains indicate respective domain impact values. Positive impact values (such as Handover 0.01 for the Downstream RAN domain) indicate a better than average performance, while negative impact values (such as Channel Quality −1.06 in the Upstream RAN) indicate a worse than average performance. The domains without numbers (such as "Drop" in the Upstream RAN) are providing average performance; the effective value for each of these domains is 0. The individual feature values are not shown in FIG. 9, none of the individual features has a particularly high or low impact value. The names of the individual features shown in FIG. 9 are specific to the system to which that figure relates; the exact nature of each individual feature in the figure is not relevant. From review of the high level domains below the KPI value, it is clear that the Upstream RAN has a significantly larger contribution to the KPI degradation than the Downstream RAN. Analysis of the knowledge graph shows that the main contribution to the KPI degradation is the SINR value of −0.78; root cause analysis would therefore output the SINR as the root cause of the KPI degradation.

Figure 10:
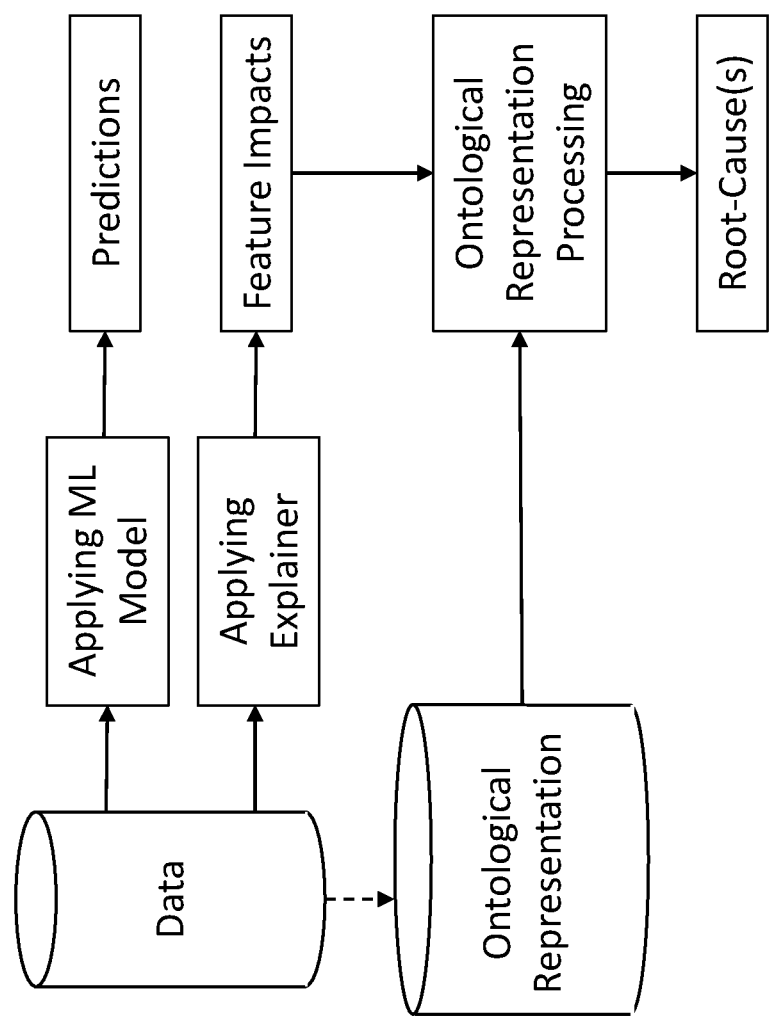
FIG. 10 is a schematic overview of a process by which one or more root causes for a prediction value may be obtained in accordance with aspects of embodiments.

A schematic overview of the process by which one or more root causes for a prediction value may be obtained, in accordance with aspects of embodiments, is shown in FIG. 10. As shown in FIG. 10, feature measurement data (that has been obtained) is processed by a trained ML model and also by a generated explainer. Separately, a knowledge base (potentially generated form expert knowledge of one or more experts) is represented using an ontological representation. The ML model generates a prediction based on the data, and the explainer generates feature impacts. The feature impacts are then used to update the ontological representation, and the updated ontological representation is used to derive one or more root causes for the prediction value. These root causes are then outputted. Once expert knowledge has been used in the generation of the ontological representation, the process can be performed with minimal human input. The root cause analysis method is therefore less labour intensive than previous methods. Further, the disclosed method and/or apparatus can be used to handle highly complex datasets, and may also incorporate causal relationships (in addition to observed correlations) into the analysis. Accordingly the disclosed method and/or apparatus may provide more accurate analysis than existing methods. As a result of the accurate root cause analysis provided, problems (such as KPI degradation) may be swiftly arrested or reversed, and the overall operation of systems subject to the root cause analysis may be improved.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure. For the avoidance of doubt, the scope of the disclosure is defined by the claims.

The invention claimed is:

1. A method for root cause analysis, the method comprising:
   obtaining measurement data comprising measurements data of features of a system;
   generating a prediction value by applying a trained machine learning, ML, model to the measurement data;
   generating additive feature impact values by applying a generated additive ML model explainer to the measurement data, wherein the additive feature impact values represent an additive contribution of each feature to the prediction value;
   updating an ontological representation of connections between the features of the system and the prediction value using the generated feature impact values; and
   outputting a proposed root cause, based on the updated ontological representation, wherein the proposed root cause is responsible for the prediction value.

2. The method of claim 1, further comprising generating the ontological representation using expert knowledge relating to the system.

3. The method of claim 1, wherein the ontological representation is a knowledge graph.

4. The method of claim 3, wherein the knowledge graph has a static structure.

5. The method of claim 3, wherein the knowledge graph represents causal relationships between measurement data of features, domains and prediction values.

6. The method of claim 5, wherein a given feature for which measurement data is obtained directly impacts a single domain, and/or wherein a further given feature for which measurement data is obtained directly impacts plural domains.

7. The method of claim 1, further comprising training the ML model and/or generating the ML model explainer.

8. The method of claim 7, wherein the ML model training and ML model explainer generation are performed in parallel.

9. The method of claim 1, wherein the ML model is a neural network or boosted decision tree.

10. The method of claim 1, wherein the outputting the proposed root cause comprises outputting a plurality of root causes that are collectively responsible for the prediction value.

11. The method of claim 1, wherein the system is at least a part of a telecommunications network.

12. The method of claim 10, wherein the prediction value is a Key Performance Indicator, KPI, value.

13. The method of claim 11, wherein the KPI is a Voice over Long Term Evolution, LTE, Mean Opinion Score, VOLTE MOS.

14. The method of claim 10, wherein the measurement data of features are telecommunications network metrics.

15. The method of claim 1, further comprising suggesting an action to address the proposed root cause.

16. The method of claim 15, further comprising performing the action on the system.

17. A root cause analyser for root cause analysis, the root cause analyser comprising processing circuitry and a memory containing instructions executable by the processing circuitry, whereby the root cause analyser is operable to:
   obtain measurement data comprising measurements data of features of a system;
   apply a trained machine learning, ML, model to the measurement data, and generate a prediction value;
   apply a generated additive ML model explainer to the measurement data and the trained ML model, and generate additive feature impact values, wherein the additive feature impact values represent an additive contribution of each feature to the prediction value;
   update an ontological representation of connections between the features and the prediction value using the generated feature impact values; and
   output a proposed root cause, based on the updated ontological representation, wherein the proposed root cause is responsible for the prediction value.

18. The root cause analyser of any claim 17, further configured to output a plurality of root causes that are collectively responsible for the prediction value.

19. The root cause analyser of claim 17, further configured to suggest an action to address the proposed root cause.

20. A root cause analyser for root cause analysis, the root cause analyser comprising:
   an obtainer configured to obtain measurement data comprising measurements data of features of a system;
   a data analyser configured to apply a trained machine learning, ML, model to the measurement data, and generate a prediction value;
   a feature impact value generator configured to apply a generated additive ML model explainer to the measurement data, and generate additive feature impact values, wherein the additive feature impact values represent an additive contribution of each feature to the prediction value;
   an ontological representation controller configured to update an ontological representation of connections between the features and the prediction value using the generated feature impact values; and
   an outputter configured to output a proposed root cause, based on the updated ontological representation, wherein the proposed root cause is responsible for the prediction value.

* * * * *